July 14, 1931.  A. L. ROMANOFF  1,813,959
GAS CONDITIONING APPARATUS
Filed Nov. 17, 1928
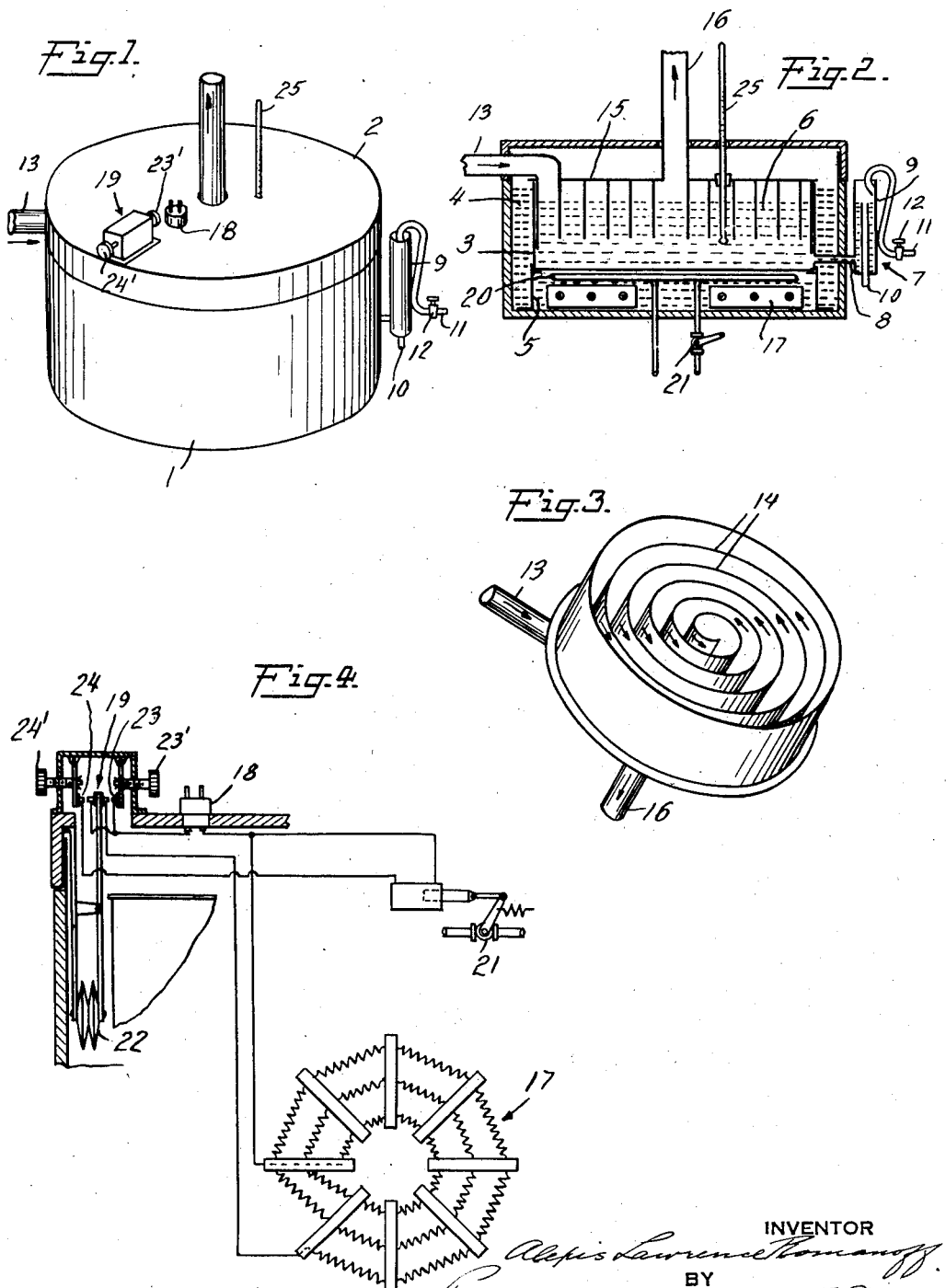
INVENTOR
Alexis Lawrence Romanoff
BY
ATTORNEYS Patented July 14, 1931

1,813,959

UNITED STATES PATENT OFFICE

ALEXIS LAWRENCE ROMANOFF, OF ITHACA, NEW YORK

GAS CONDITIONING APPARATUS

Application filed November 17, 1928. Serial No. 320,051.

This invention relates to gas conditioning apparatus and more particularly to humidifying apparatus suitable for use in any room, compartment, incubator or the like, wherein it is desired to maintain a circulation of air or other gas of uniform predetermined humidity.

It is an object of my invention to provide improved apparatus for conditioning air or other gas whereby any predetermined condition of humidity may be maintained quite independent of variations in the moisture content of the unconditioned gas. In general, my invention comprises a simple and efficient apparatus suitable for conditioning air or other gas supplied to an incubator, room or compartment of any character.

My improved apparatus includes a liquid reservoir, and means for conducting air or other gas into direct contact with the liquid in the reservoir. Means for maintaining the temperature of the liquid in the reservoir substantially constant may be provided and I prefer to employ a liquid bath in heat interchanging relation with the reservoir and means for maintaining the liquid in the reservoir at a substantially constant level. Where a bath of oil or other electrically insulating medium is employed, I prefer to employ an electric heating element for heating the liquid bath, and the control of current to this element may be automatically regulated by means responsive to the temperature of the bath. I may also provide means for cooling the bath in the event the apparatus is to be used under conditions such that the temperature of the liquid in the reservoir may, at times, exceed that necessary for properly conditioning the gas coming in contact with this liquid.

In general, my improved gas conditioning apparatus comprises a unitary device of compact proportions which can be placed in any desirable location. In order to utilize the apparatus, it is merely necessary to establish a connection with some source of electric current, to establish a connection with a source of running water, and to connect the gas inlet port to any convenient source of unconditioned air or other gas, depending upon the conditions under which the apparatus is to be used. The apparatus may be adjusted so as to maintain any predetermined temperature of the liquid in the reservoir, and this insures the desired humidification of the gas passing through the apparatus.

The various objects and advantages of my invention will be more apparent upon considering the following detailed description of one embodiment of my invention illustrated in the accompanying drawings, in which;

Fig. 1 is a perspective view of an apparatus embodying my invention;

Fig. 2 is a vertical section view of the apparatus shown in Fig. 1;

Fig. 3 is a perspective view of a portion of the apparatus shown in Figs. 1 and 2; and Fig. 4 is a diagrammatic view showing the electric circuits and showing the certain parts in the apparatus in cross section.

The embodiment of my invention illustrated in the accompanying drawings comprises an apparatus suitable for maintaining an exceedingly accurate control of wide range humidity condition of air in any room, compartment incubator or the like and this by means of a compact portable unitary apparatus heated and regulated electrically. At times the apparatus functions as a condenser removing excess moisture from the air and at other times it functions as an evaporator supplying moisture to unsaturated air. Regardless of climatic, seasonal or atmospheric conditions outdoor fresh air may be drawn into the apparatus by natural draft or by any artificial means and the air passes through a long passage whereby the air is exposed to a large surface of water maintained at a predetermined temperature to produce the necessary condensation or evaporation whereby the air at a predetermined temperature and fully saturated with water is properly conditioned before leaving the apparatus to provide a predetermined humidity condition of the air.

In Figures 1 and 2 of the accompanying sheet of drawings I have illustrated a casing 1 provided with a removable cover 2 and containing a water reservoir 3 spaced apart from the inner wall of the container so as to provide ample space for the oil bath 4 entirely surrounding the sides and bottom of the water reservoir. The reservoir 3 may be supported within the casing 1 by means of brackets 5 or other suitable supporting means. Water shown at 6 in the reservoir 3 is maintained at a substantially constant level by means of a water leveling device 7 communicating with the reservoir 3 near the bottom thereof by means of a connecting pipe 8. The water leveling device comprises a small water receptacle 9 having an overflow pipe 10, and a source of running water 11 continuously supplies water to the receptacle 9 under the control of an adjusting valve 12. The device for maintaining the water in the reservoir at a substantially constant level is preferably of such a nature that only enough fresh water flows into the reservoir 3 to maintain the desired level. In this way undesirable changes in the temperature of the water in the reservoir due to changes in the temperature of the water supply can be avoided. I prefer to have the water supplied to the reservoir 3 near the bottom thereof or in general in such a manner that the surface of the water in reservoir 3 may remain quiescent at all times.

I have illustrated an air inlet pipe 13 through which fresh air from any convenient source may be drawn into the humidifying apparatus. This inlet pipe communicates with a long passage directly above the surface of the water in reservoir 3, this passage being formed by a series of convolutions of sheet metal 14 partially immersed in the water in reservoir 3 and secured to a cover plate 15 having a central opening communicating with the discharge pipe 16. The air entering through pipe 13 flows through the circuitous passage formed by the convolutions 14 and ultimately escapes at the center through pipe 16. Since the level of the water in reservoir 3 is always maintained constant the volume of the air passage remains substantially constant whereby the air is brought into contact with the water under constant conditions as to area of surface contact with the water and volume of air brought into contact with the water.

The space surrounding the water reservoir 3 may be filled with an electric insulating fluid, such as oil, which may constitute a medium for maintaining the temperature of the water reservoir constant. I prefer to provide an electric heating element 17 in the base of the casing 1 and immersed in the oil bath, together with means responsive to the temperature of the oil bath for controlling the supply of current to the electric heating element. A switch plug 18 may be connected to any suitable source of electric current for the purpose of supplying current to the heating element 17 under the control of an automatically operated switch 19. A water cooling coil 20 may be immersed in the oil bath 4 and water may be supplied to this coil under the control of an electromagnetically operated valve 21. The switch 19 operates electrically to supply current either to the heating element 17 or to the operating coil of the electro-magnetic valve 21. The switch 19 may be operated in response to changes in temperature of the oil bath, the operation of the switch being effected by means of a suitable sensitive element immersed in the bath, such as the bellows 22. When the temperature of the bath exceeds a predetermined value the bellows 22 expands and opens the electric circuit at contact 23 and, if the temperature of the bath is excessive, the bellows expands far enough to close the electric circuit through contact 24. The opening of the circuit at contact 23 interrupts the flow of current to the heating element and the closing of the circuit at contact 24 causes current to flow to the operating coil of the electro-magnetic valve, thereby supplying cooling water to the coil 20. The contacts 23 and 24 may be adjusted by suitable adjusting means, such as the screws shown at 23' and 24'. A thermometer 25 may be used for the purpose of indicating the temperature of the water in the reservoir 3 and the adjusting devices 23' and 24' may be adjusted so as to provide any predetermined temperature of the water bath, thus ensuring the desired degree of humidity of the air flowing from the apparatus.

The water reservoir 3 being immersed in an oil bath kept at a regulated temperature serves at times as an evaporator and at other times as a condenser, depending upon the condition of the air flowing into the apparatus. By providing a circuitous path for the current of air confined in contact with the water, a maximum exposure of the water to the air can be attained in an apparatus of relatively small dimensions.

It is to be understood that my invention is not limited to the details of construction illustrated in the accompanying drawings but includes all embodiments of the improved humidifying apparatus as set forth in the appended claims.

I claim:—

1. A gas conditioning apparatus comprising a liquid reservoir, means for conducting a gas into direct contact with the liquid in said reservoir and means for supplying heat to the liquid when the temperature thereof falls below a predetermined value and for cooling said liquid when the temperature thereof rises above a predetermined value.

2. A gas conditioning apparatus comprising a liquid reservoir, means for conducting said gas into said reservoir and into contact with the liquid therein, a liquid bath surrounding said reservoir, and means for supplying heat to said bath, and means responsive to the temperature of the bath for controlling the means for supplying heat thereto.

3. A gas conditioning apparatus comprising a liquid reservoir, means for conducting a gas into direct contact with the liquid in said reservoir, an oil bath surrounding said reservoir, an electric heating element immersed in said oil bath, means for supplying electric current to said heating element, and means responsive to the temperature of the oil bath for controlling the supply of current to said heating element.

4. A unitary humidifying apparatus comprising a closed container adapted to contain a liquid insulating medium, a reservoir within said container and spaced apart from the walls thereof, means for conducting air into direct contact with liquid in said reservoir, an electric heating element arranged in heat interchanging relation with said liquid medium, means for supplying electric current to said heating element, and means responsive to the temperature of said liquid medium for controlling the supply of electric current to said heating element.

5. A unitary humidifying apparatus comprising a closed container adapted to contain a liquid insulating medium, a reservoir within said container and spaced apart from the walls thereof, means for conducting air into direct contact with liquid in said reservoir, an electric heating element arranged in heat interchanging relation with said liquid medium, means for supplying electric current to said heating element, means for indicating the temperature of the liquid in said reservoir and means for maintaining the liquid in said reservoir at a substantially constant level.

In testimony whereof I affix my signature.
ALEXIS LAWRENCE ROMANOFF.